United States Patent
Miura et al.

(10) Patent No.: US 6,677,539 B2
(45) Date of Patent: Jan. 13, 2004

(54) LOAD SENSOR EQUIPPED WITH STRAIN-GENERATING MEMBER HAVING STRAIN ELEMENTS WITH TUBE SPACER FOR ELIMINATING CLAMPING FORCE

(75) Inventors: Akito Miura, Miyagi-ken (JP); Koichi Takahashi, Miyagi-ken (JP); Kunio Shimbo, Miyagi-ken (JP); Hiroshi Aoki, Shiga-ken (JP)

(73) Assignee: Alps Electric Co., Ltd, Tokyo (JP)

( * ) Notice: Subject to any disclaimer, the term of this patent is extended or adjusted under 35 U.S.C. 154(b) by 11 days.

(21) Appl. No.: 09/954,668

(22) Filed: Sep. 12, 2001

(65) Prior Publication Data

US 2002/0033283 A1 Mar. 21, 2002

(30) Foreign Application Priority Data

Sep. 18, 2000 (JP) ........................................ 2000-282491

(51) Int. Cl.⁷ .................................................. G01L 1/22
(52) U.S. Cl. ........................ 177/136; 177/144; 177/211; 177/DIG. 9; 73/862.474; 73/862.632; 180/273; 280/735
(58) Field of Search .................. 180/273; 280/735; 701/45; 340/667; 177/25.11, 25.13, 136, 144, 210 R, 211, 229, DIG. 9; 73/862.474, 862.632

(56) References Cited

U.S. PATENT DOCUMENTS

| | | | | |
|---|---|---|---|---|
| 4,432,247 A | | 2/1984 | Takeno et al. ........... 73/862.67 |
| 5,327,791 A | * | 7/1994 | Walker ....................... 177/211 |
| 5,478,975 A | * | 12/1995 | Ford ..................... 177/210 FP |
| 5,991,676 A | * | 11/1999 | Podoloff et al. .............. 701/45 |
| 6,039,344 A | * | 3/2000 | Mehney et al. ............. 280/735 |

FOREIGN PATENT DOCUMENTS

| JP | 2-309223 | 12/1990 |
|---|---|---|
| JP | 8-4573 | 2/1996 |

* cited by examiner

*Primary Examiner*—Randy Gibson
(74) *Attorney, Agent, or Firm*—Beyer Weaver & Thomas

(57) ABSTRACT

A load sensor is assembled by screwing a nut on a bolt, sequentially fitting a washer and a tube spacer on the bolt, fitting a bore of a strain-generating member on the tube spacer, fitting another washer on the bolt, tightening another nut, and clamping a bobbin-shaped unit composed of the washers and the tube spacer between the nuts in the axial direction of the bolt. Since the strain-generating member having a thickness less than the height of a strain-generating member holding space formed between the washers is placed in the space with some clearance, even when the washers are fixed to the bolt by a strong pressing force, the pressing force will not directly act on the strain-generating member.

7 Claims, 4 Drawing Sheets

LOAD SENSOR EQUIPPED WITH STRAIN-GENERATING MEMBER HAVING STRAIN ELEMENTS WITH TUBE SPACER FOR ELIMINATING CLAMPING FORCE

BACKGROUND OF THE INVENTION

1. Field of the Invention

The present invention relates to a load sensor for determining the amount of a load on the basis of the degree of bending of a platelike strain-generating member having strain elements thereon, and more particularly, to a mounting structure for supporting a strain-generating member on a fixed shaft such as a bolt.

2. Description of the Related Art

FIG. 8 is an explanatory view of such a type of conventional load sensor. In the load sensor, strain elements 1 made of a thick film resistive material are mounted on a strain-generating member 2 made of a metal plate and having a bore 2a. A load point 2b, to which a load from an object to be measured is applied, is formed at the leading end of the strain-generating member 2. A bolt 3 is passed through the bore 2a, and is fixed, by using a nut 9 or the like, to a frame 4 or the like which serves as a mounting member. A pair of washers 5 and 6 shaped like a flat plate are fitted on the bolt 3. The rim of the bore 2a of the strain-generating member 2 is positioned so that it is disposed between the washers 5 and 6. A pair of nuts 7 and 8 are screwed on the bolt 3. The washer 6, the strain-generating member 2, and the washer 5 are fixedly clamped between the nuts 7 and 8 in a stacked state.

That is, in order to mount the strain-generating member 2 on the bolt 3, the nut 8 is screwed on the bolt 3, the washer 6, the strain-generating member 2, and the washer 5 are sequentially fitted on the bolt 3, the nut 7 is screwed on the bolt 3, and both of the nuts 7 and 8 are tightened. Since the washers 5 and 6, which sandwich the rim of the bore 2a of the strain-generating member 2, are thereby clamped between the nuts 7 and 8 in the axial direction of the bolt 3, the strain-generating member 2 can be firmly fixed to the bolt 3 via the washers 5 and 6.

In this type of load sensor, the strain-generating member 2 is shaped like a metal plate made of SUS or the like and has a thickness of, for example, approximately 2 mm. When a strong clamping force acts on the strain-generating member 2 in the thickness direction thereof, the strain-generating member 2, including the portion where the strain elements 1 are mounted, is slightly distorted, and this has an adverse effect on the properties of the strain elements 1. Therefore, in the conventional art in which the rim of the bore 2a of the strain-generating member 2 is tightly clamped by the washers 5 and 6, it is difficult to bring the surfaces of the strain-generating member 2 and the washers 5 and 6 into complete contact with each other. Since it is also difficult to bring the surfaces of the washers 5 and 6 and the nuts 7 and 8 into complete contact with each other, the portions of the strain-generating member 2 where the stress from the washers 5 and 6 are concentrated cannot be determined. For this reason, the degree of the distortion due to the clamping force substantially varies, and the properties of the strain elements 1 differ among products. That is, conventionally, even when equivalent loads are applied to the load point 2b, the output values of the strain elements 1 are apt to vary among products, and it is impossible to achieve high reliability.

SUMMARY OF THE INVENTION

The present invention has been made in view of the conventional circumstances, and it is an object of the present invention to provide a highly reliable load sensor in which nuts can be prevented from loosening with time, a strain-generating member can be reliably mounted, and the properties of strain elements do not vary among products.

In order to achieve the above object, according to an aspect of the present invention, there is provided a load sensor including a platelike strain-generating member having a bore formed at a distance from a load point on which a load acts, a strain element mounted on the strain-generating member between the load point and the bore, a fixed shaft for supporting the strain-generating member, and a spacer member fixed to the fixed shaft, wherein the spacer member has a shaft portion to be passed through the bore of the strain-generating member, and a flange portion extending from the shaft portion along the surface of the strain-generating member, and a strain-generating member holding space is formed between the flange portion and the rim of the bore so as to extend in the axial direction of the fixed shaft.

Since the strain-generating member having a thickness less than the height of the strain-generating member holding space is placed in the strain-generating member holding space, even when the spacer member is fixed to the fixed shaft by a strong pressing force, the pressing force does not directly act on the strain-generating member. For this reason, the strain-generating member is not subjected to an unreasonably large force when mounted, and variations in properties of the strain elements among products can be avoided. Moreover, even when the spacer member is mounted to the fixed shaft by a strong pressing force, this does not have any adverse effect on the detection accuracy, and therefore, prevention of loosening with time can be guaranteed. By placing the rim of the bore of the strain-generating member opposed to the spacer member so that there is a slight clearance therebetween, it is possible to prevent the displacement of the strain-generating member in the thickness direction thereof from adversely affecting detection data.

Preferably, the fixed shaft is a threaded bolt, and the spacer member is fixed by nuts fastened to the bolt. This makes is possible to easily and reliably perform the mounting operation. In this case, the spacer member may include a tube spacer having a length greater than the thickness of the strain-generating member so that it can be passed through the bore, and a pair of platelike washers for clamping the tube spacer by the nuts. Alternatively, the spacer member may include a pair of convex washers each having a cylindrical portion at the center thereof. The cylindrical portions of the washers may be clamped by the nuts, and the bore of the strain-generating member may be fitted on the cylindrical portions.

Preferably, the thickness of the portion of the strain-generating member adjacent to the bore is set to be greater than the thickness of the portion of the strain-generating portion where the strain element is mounted. In this case, when the strain-generating member is bent as a result of an application of a load to the load point, deformation starts on the border between the thin portion and the thick portion. Therefore, even when the holding position of the strain-generating member is displaced to some extent, the starting point of deformation does not change, and the reliability is further improved.

Preferably, the strain-generating member holding space is filled with a fixing adhesive. In this case, since the holding position of the strain-generating member is not displaced, the starting point of deformation is stabilized, and the reliability is further improved.

According to another aspect of the present invention, there is provided a load sensor including a platelike strain-generating member having a bore formed at a distance from a load point on which a load acts, a strain element mounted on the strain-generating member between the load point and the bore, a fixed shaft passed through the bore of the strain-generating member, a pair of spacer members fitted on the fixed shaft with the strain-generating member therebetween, and a fixing means for fixing the spacer members by pressing the spacer members in the axial direction of the fixed shaft, wherein a concave or convex pressed portion is formed at a predetermined position on the periphery of the bore of the strain-generating member, the pressed portion is clamped between the spacer members, and the front and back surfaces of the strain-generating member except the pressed portion are held spaced from the spacer members.

In this case, since a clamping force is applied only to a predetermined position on the periphery of the bore of the strain-generating member, even when the strain-generating member is slightly distorted due to clamping, the degree of distortion does not vary among products. Consequently, the properties of the strain elements do not vary among products, and reliability is improved.

Further objects, features, and advantages of the present invention will become apparent from the following description of the preferred embodiments with reference to the attached drawings.

DESCRIPTION OF THE PREFERRED EMBODIMENTS

Figure 1:
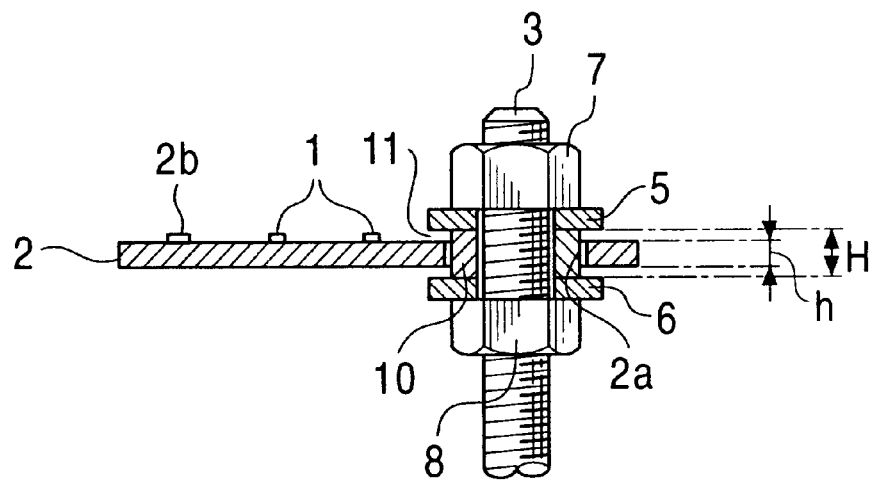
FIG. 1 is a sectional view showing the principal part of a load sensor according to a first embodiment of the present invention.
Figure 2:
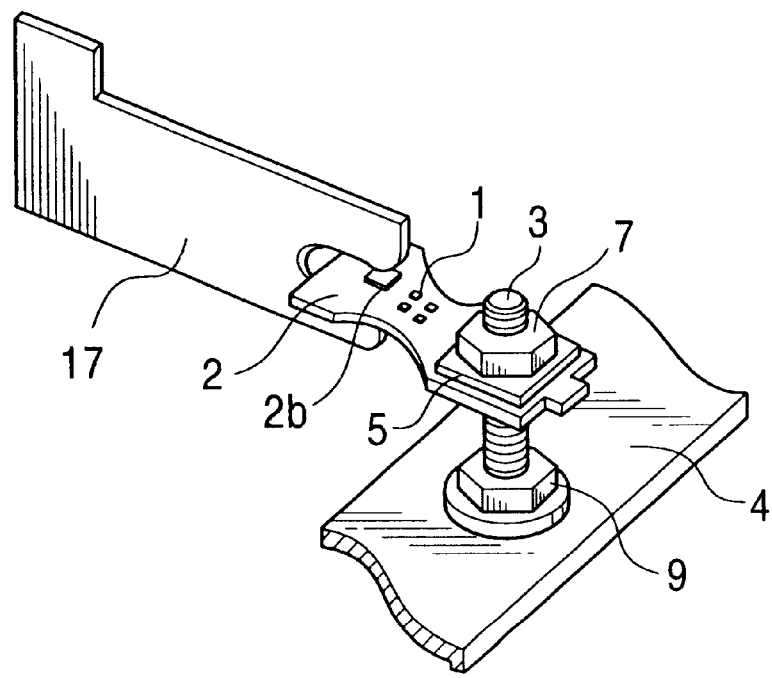
FIG. 2 is a general perspective view of the load sensor shown in FIG. 1.
Figure 3:
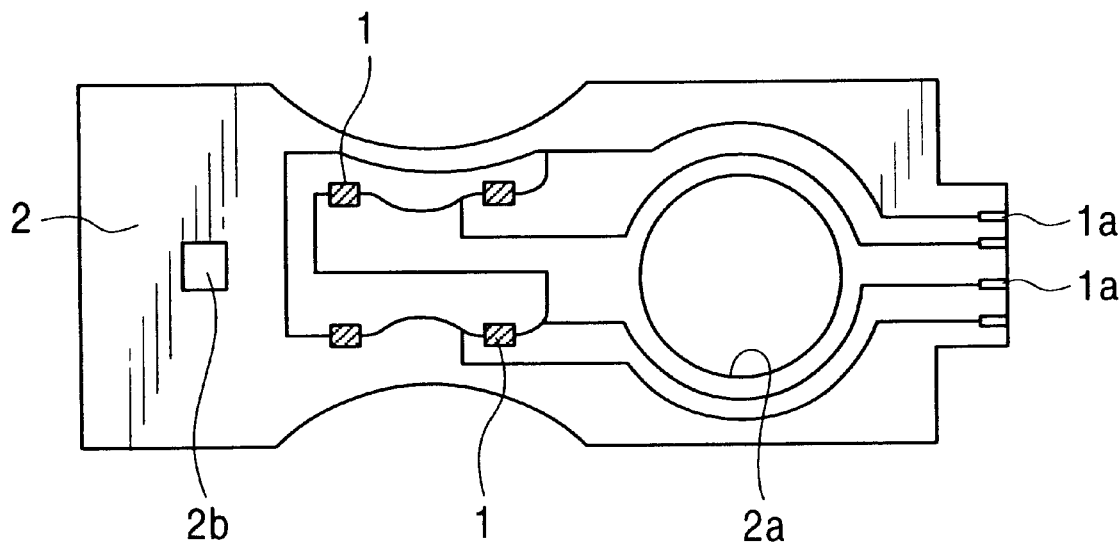
FIG. 3 is a plan view of a strain-generating member shown in FIGS. 1 and 2.
Figure 4:
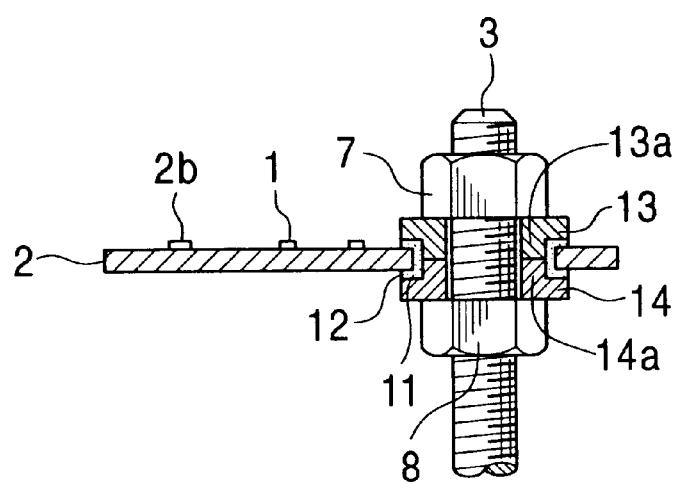
FIG. 4 is a sectional view showing the principal part of a load sensor according to a second embodiment of the present invention.
Figure 5:
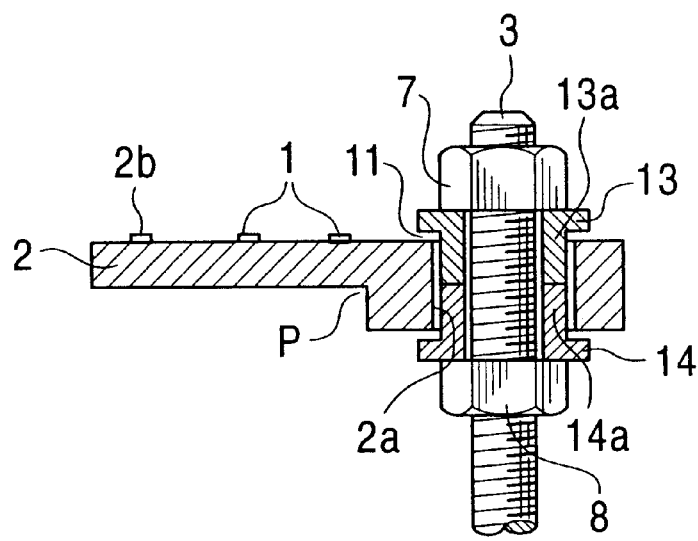
FIG. 5 is a sectional view showing the principal part of a load sensor according to a third embodiment of the present invention.
Figure 6:
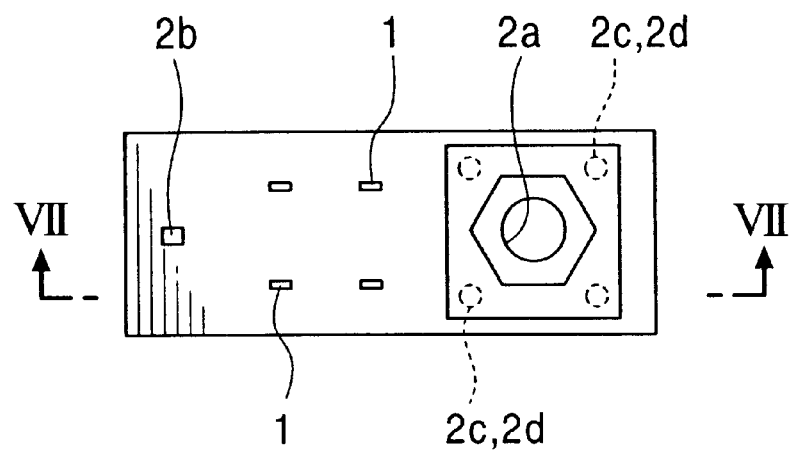
FIG. 6 is a plan view showing the principal part of a load sensor according to a fourth embodiment of the present invention.
Figure 7:
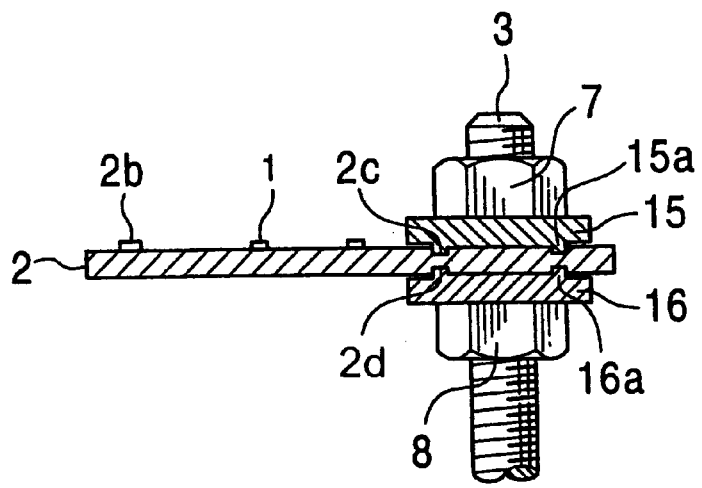
FIG. 7 is a sectional view of the load sensor, taken along line VII—VII in FIG. 6.
Figure 8:
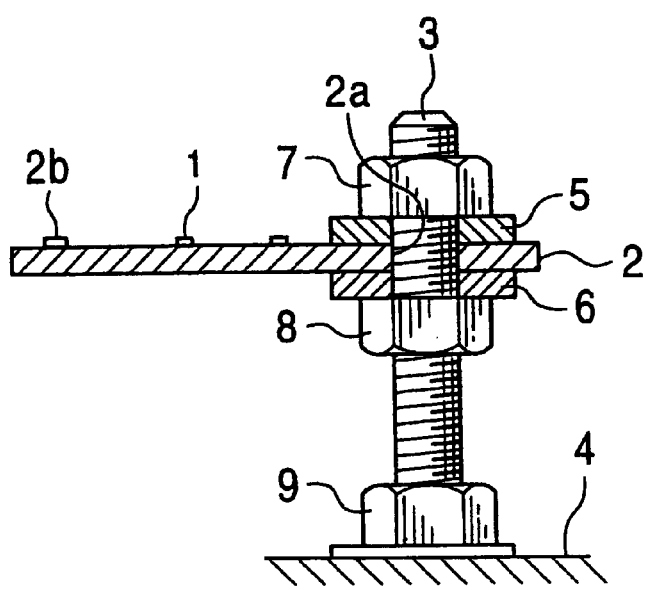
FIG. 8 is a sectional view showing the principal part of a conventional load sensor.

Preferred embodiments of the present invention will be described with reference to the attached drawings. FIG. 1 is a sectional view showing the principal part of a load sensor according to a first embodiment of the present invention, FIG. 2 is a general perspective view of the load sensor shown in FIG. 1, FIG. 3 is a plan view of a strain-generating member shown in FIGS. 1 and 2, FIG. 4 is a sectional view showing the principal part of a load sensor according to a second embodiment, FIG. 5 is a sectional view showing the principal part of a load sensor according to a third embodiment, FIG. 6 is a plan view showing the principal part of a load sensor according to a fourth embodiment, and FIG. 7 is a sectional view of the load sensor, taken along line VII—VII in FIG. 6. In these figures, components corresponding to those in FIG. 8 are denoted by the same reference numerals.

A first embodiment of the present invention will now be described with reference to FIGS. 1 to 3. In a load sensor of the first embodiment, strain elements 1 made of a thick film resistive material are mounted on a strain-generating member 2 which is made of a metal plate and which has a bore 2a. The strain elements 1 and the strain-generating member 2 constitute a strain gauge. As shown in FIG. 2, the load sensor is incorporated in the seat of a car so as to detect the weight of a passenger. The load of the passenger acts on a load point 2b formed at the leading end of the strain-generating member 2 via an arm 17 fixed to the seat. A bolt 3 serving as the fixed shaft is fixed to a seat frame 4 of the car, which serves as the mounting member, by a nut 9. A pair of platelike washers 5 and 6 are fitted on the bolt 3, and the inner peripheral portions thereof clamp a tube spacer 10 fitted on the bolt 3. An annular strain-generating member holding space 11 is formed between the washers 5 and 6 and outside the tube spacer 10 so that the rim of the bore 2a of the strain-generating member 2 is placed therein. The height H of the strain-generating member holding space 11, that is, the height H of the tube spacer 10, is set to be slightly greater than the thickness h of the strain-generating member 2 placed therein. A pair of nuts 7 and 8 are screwed on the bolt 3, and the washer 6, the tube spacer 10, the washer 5 are fixedly clamped therebetween in a stacked state.

In this embodiment, the strain elements 1 are placed at four positions on the upper surface of the strain-generating member 2, as shown in FIG. 3. Four terminals 1a of a Wheatstone bridge circuit formed by linking the four strain elements 1 are collected at the end of the strain-generating member 2 adjacent to the bore 2a.

In the above-described configuration, in order to mount the strain-generating member (strain gauge) 2 with the strain elements 1 to the bolt 3, the nut 8 is screwed on the bolt 3, the washer 6 and the tube spacer 10 are sequentially fitted on the bolt 3, and the bore 2a of the strain-generating member 2 is fitted on the tube spacer 10. Then, the washer 5 is fitted on the bolt 3, the nut 8 is screwed on the bolt 3, and the nuts 7 and 8 are tightened. Thereby, a bobbin-shaped unit (spacer member) composed of the washers 5 and 6 and the tube spacer 10 is clamped between the nuts 7 and 8 in the axial direction of the bolt 3. The washers 5 and 6 and the tube spacer 10 can be firmly fixed to the bolt 3 and can be prevented from loosening with time by applying a strong clamping force thereto. Even when a strong clamping force is applied to the washers 5 and 6 and the tube spacer 10, however, since the rim of the bore 2a of the strain-generating member 2 is placed inside the strain-generating member holding space 11 with some play, the clamping force of the nuts 7 and 8 will not directly act on the strain-generating member 2.

In this embodiment, since the strain-generating member 2 having a thickness less than the height of the strain-generating member holding space 11 between the washers 5 and 6 is placed in the strain-generating member holding space 11, even when the washers 5 and 6 are fixed to the bolt 3 by being clamped between the nuts 7 and 8, the clamping force does not directly act on the strain-generating member 2. For this reason, it is possible to prevent the properties of the strain elements 1 from varying due to the clamping and fixing of the strain-generating member 2, and to improve the detection reliability. Moreover, since the fixing of the washers 5 and 6 to the bolt 3 by a strong force does not have any adverse effect on the detection accuracy, the nuts 7 and 8 can be firmly tightened in order to prevent loosening with time.

In addition, since the rim of the bore 2a of the strain-generating member 2 faces the washers 5 and 6 with a small clearance therebetween, there is little fear that the displacement of the strain-generating member 2 in the thickness direction thereof will adversely affect detection data.

In a second embodiment of the present invention, as shown in FIG. 4, a pair of washers 13 and 14 having cylindrical portions 13a and 14a are placed one on the other in the shape of a nut, and are clamped between nuts 7 and 8, and a strain-generating member holding space 11 is formed on the outer sides of the cylindrical portions 13a and 14a of the washers 13 and 14. Therefore, no tube spacer is used. Moreover, since the clearance formed between the washers 13 and 14 and a strain-generating member 2, that is, the clearance in the strain-generating member holding space 11, is filled with an anaerobic adhesive 12 which rarely shrinks when being set, the holding position of the strain-generating member 2 will not become displaced, and the starting point of deformation due to the bending of the strain-generating member 2 is stabled.

In a third embodiment of the present invention, as shown in FIG. 5, the thickness of a portion of a strain-generating member 2 adjacent to a bore 2a is set to be greater than that of an extended portion thereof on which strain elements 1 are mounted. By thus increasing the thickness of the strain-generating member 2 at the base end which is opposite from a load point 2b, when a load is applied to the load point 2b and the strain-generating member 2 is bent, the starting point of deformation is placed on the boundary P between the thin portion and the thick portion. Therefore, even when the holding position of the strain-generating member 2 is displaced to some extent, the starting point of deformation does not change. In the third embodiment, a pair of washers 13 and 14 having cylindrical portions 13a and 14a are placed one on the other in the shaped of a bobbin, and are clamped between nuts 7 and 8, in a similar manner to that in the second embodiment.

In a fourth embodiment of the present invention, as shown in FIGS. 6 and 7, a plurality of (for example, four) concave pressed portions 2c and a plurality of concave pressed portions 2d are respectively formed on the front and back surfaces of a strain-generating member 2 adjacent to a bore 2a. A pair of washers 15 and 16 fitted on a bolt 3 and opposed to each other with the strain-generating member 2 therebetween have a plurality of pressing projections 15a and 15b which are to be inserted in the pressed portions 2c and 2d, respectively. Since the washers 15 and 16 are clamped between nuts 7 and 8 and are fixed to the bolt 3 while the pressing projections 15a and 16a are inserted in the corresponding pressed portions 2c and 2d, the strain-generating member 2 is fixedly clamped between the washers 15 and 16 at the plural pressed portions 2c and 2d. The front and back surfaces of the strain-generating member 2 except the pressed portions 2c and 2d are held spaced from the washers 15 and 16.

Unlike the above first to third embodiments, the fourth embodiments adopts the mounting structure in which the clamping force of the nuts 7 and 8 directly acts on the strain-generating member 2. Since the portions of the strain-generating member 2 to be clamped (the pressed portions 2c and 2d), that is, the portions on which the stress from the washers 15 and 16 clamped between the nuts 7 and 8 is concentrated, are preset, variations in degree of slight distortion due to the clamping force will not vary among products. Therefore, even when a strong clamping force is applied to the strain-generating member 2 in order to prevent the nuts 7 and 8 from loosening with time, the properties of the strain elements 1 do not vary among products, and high reliability can be achieved.

In the fourth embodiment, convex pressed portions may be formed adjacent to the bore 2a of the strain-generating member 2. In the first, third, and fourth embodiments, reliability can be further improved by filling the space around the bore 2a of the strain-generating member 2 with a fixing adhesive, such as an anaerobic adhesive, in a manner similar to that in the second embodiment.

While the nuts 7 and 8 are screwed on the bolt 3 serving as the fixed shaft in the above embodiments, when the strain-generating member 2 is mounted to a fixed shaft having no thread groove, such as a rivet, a spacer member, such as a washer, may be clamped by riveting or by other means.

While the load sensor which is incorporated in the seat of the car so as to detect the weight of the passenger has been described in the above embodiments, the load sensor of the present invention is also applicable to various fields of, for example, a load transducer and stress analysis.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A load sensor comprising:
    a strain-generating member having a bore formed at a distance from a load point on which a load acts;
    a strain element mounted on said strain-generating member between said load point and said bore;
    a fixed shaft for supporting said strain-generating member; and
    a spacer member fixed to said fixed shaft,
    wherein said spacer member has a shaft portion to be passed through said bore of said strain-generating member, and a flange portion extending from said shaft portion along the surface of said strain-generating member, and a strain-generating member holding space is formed between said flange portion and the rim of said bore so as to extend in the axial direction of said fixed shaft.

2. A load sensor according to claim 1, wherein said fixed shaft is a threaded bolt, and said spacer member is fixed by nuts fastened to said bolt.

3. A load sensor according to claim 2, wherein said spacer member includes a tube spacer having a length greater than the thickness of said strain-generating member so as to be passed through said bore, and a pair of washers for clamping said tube spacer by said nuts.

4. A load sensor according to claim 2, said spacer member includes a pair of convex washers each having a cylindrical portion at the center thereof, said cylindrical portions of said washers are clamped by said nuts, and said bore of said strain-generating member is fitted on said cylindrical portions.

5. A load sensor according to claim 1, wherein the thickness of a portion of said strain-generating member adjacent to said bore is set to be greater than the thickness of a portion of said strain-generating portion where said strain element is mounted.

6. A load sensor according to claim 1, wherein said strain-generating member holding space is filled with a fixing adhesive.

7. A load sensor comprising:
- a strain-generating member having a bore formed at a distance from a load point on which a load acts;
- a strain element mounted on said strain-generating member between said load point and said bore;
- a fixed shaft passed through said bore of said strain-generating member;
- a pair of spacer members fitted on said fixed shaft with said strain-generating member therebetween; and
- fixing means for fixing said spacer members by pressing said spacer members in the axial direction of said fixed shaft, wherein a concave or convex pressed portion is formed at a predetermined position on the periphery of said bore of said strain-generating member, said pressed portion is clamped between said spacer members, and the front and back surfaces of said strain-generating member except said pressed portion are held spaced from said spacer members.

* * * * *

UNITED STATES PATENT AND TRADEMARK OFFICE
CERTIFICATE OF CORRECTION

| | |
|---|---|
| PATENT NO. | : 6,677,539 B2 |
| APPLICATION NO. | : 09/954668 |
| DATED | : January 13, 2004 |
| INVENTOR(S) | : Miura et al. |

It is certified that error appears in the above-identified patent and that said Letters Patent is hereby corrected as shown below:

ON TITLE PAGE:

Item (73) "Assignee" section, please add --TAKATA CORPORATION, Tokyo (JP)--.

Signed and Sealed this

Thirtieth Day of March, 2010

David J. Kappos
*Director of the United States Patent and Trademark Office*